United States Patent [19]

Tragatschnig

[11] Patent Number: 4,875,234
[45] Date of Patent: * Oct. 17, 1989

[54] TELEPHONE

[75] Inventor: Joerg Tragatschnig, Zell am See-Thumersbach, Austria

[73] Assignee: Porsche Design GmbH, Zell am See, Austria

[*] Notice: The portion of the term of this patent subsequent to Nov. 10, 2004 has been disclaimed.

[21] Appl. No.: 1,288

[22] Filed: Jan. 8, 1987

[30] Foreign Application Priority Data

Jan. 14, 1986 [DE] Fed. Rep. of Germany ....... 3600835

[51] Int. Cl.$^4$ .............................................. H04M 1/23
[52] U.S. Cl. .................................. 379/434; 379/420; 379/433; 379/436; 379/368; 40/336
[58] Field of Search ............... 379/419, 420, 426, 369, 379/429, 430, 432, 433, 434, 435, 436, 437, 438, 439, 440, 441, 442, 445, 446, 447, 448, 449, 450, 451, 453, 454, 455, 456, 369, 368; D14/52, 53; 340/365 R; 200/5 R, 5 A; 40/336

[56] References Cited

U.S. PATENT DOCUMENTS

| D. 237,720 | 11/1975 | Kusaka et al. | D14/53 |
| D. 275,282 | 8/1984 | Adams, Jr. | D14/53 |
| D. 280,987 | 10/1985 | Todeschini | D14/53 |
| D. 284,961 | 8/1986 | Hova | D14/53 |
| D. 289,755 | 5/1987 | Todeschini | D14/53 |
| D. 291,991 | 9/1987 | Lee | D14/53 |
| D. 292,703 | 11/1987 | Tragetschnig | D14/53 |
| 2,946,857 | 7/1960 | Benjamin | 379/369 |
| 3,365,550 | 1/1968 | Brown, Jr. | 379/434 X |
| 3,480,743 | 11/1969 | Engh et al. | 379/447 |
| 3,491,221 | 1/1970 | Zamarra | 379/450 X |
| 3,941,951 | 3/1976 | Engstrom et al. | 379/436 |
| 4,032,727 | 6/1977 | Burns, Jr. | 379/369 |
| 4,581,490 | 4/1986 | Genender | 379/435 X |
| 4,581,495 | 4/1986 | Geri et al. | 379/440 |

FOREIGN PATENT DOCUMENTS

| 0288123 | 10/1915 | Fed. Rep. of Germany | 379/369 |
| 1220897 | 7/1966 | Fed. Rep. of Germany | 379/435 |
| 2902052 | 7/1980 | Fed. Rep. of Germany | 379/429 |
| 2940608 | 10/1984 | Fed. Rep. of Germany | 379/434 |
| 0136458 | 7/1985 | Japan | 379/369 |
| 0129739 | 1/1929 | Switzerland | 379/369 |
| 1117810 | 6/1968 | United Kingdom | 379/432 |

OTHER PUBLICATIONS

"Stainless Steel Solid State Tone Dial", Ceeco, [379–368].
"ITT, 'Domino' Rotary Dial Telephone", Washington Post, Sep. 20, 1978, p. B10.
"Christmas with a Ring", Washington Post, Dec. 20, 1979.
"Type 601 Telephone Set Construction", Ishimaru et al., E.C.L. Tech. Journal, Japan, vol. 27, No. 6, 1978, pp. 1251–1262.

Primary Examiner—Jin F. Ng
Assistant Examiner—Randall S. Vaas
Attorney, Agent, or Firm—Kline, Rommel & Colbert

[57] ABSTRACT

The telephone comprises a housing having a pivoted panel portion which is circular in the horizontal projection, with a key block being inserted therein. The housing and the pivoted panel portion containing the key block have substantially the form of a spherical segment. Owing to such design the telephone may safely and conveniently be operated also from a lateral or rearward position, in that the pivoted panel portion containing the key block is turned into a position where it approximately faces the operating person.

3 Claims, 3 Drawing Sheets

TELEPHONE

BACKGROUND OF THE INVENTION

The present invention relates to a telephone having a housing containing a key block.

In conventional telephones at least the portion of the cover surface of the housing, which contains the key block, is plane and inclined to the front of the telephone. The key block likewise has a plane surface which is correspondingly inclined so as to facilitate the recognizing of the designations and the handling of the dial keys. This, however, applies only to such cases when the operating person is directly in front of the telephone so that the inclined housing portion with the key block directly faces the operating person. From a lateral or even rearward position it is very difficult to handle such a telephone, especially to operate the desired dial keys, and it is therefore necessary to move the telephone into a position such that it faces the operating person.

GENERAL OUTLINE OF THE INVENTION

It is therefore the object of the invention to provide a telephone of the above kind which is improved in a way such that it may easily and conveniently be handled from all sides without a need to turn the telephone for this purpose into a position facing the operating person.

According to the invention, this object is achieved in that the panel has a pivoted panel portion which is circular in the horizontal projection and contains the key block, and in that the housing with the panel portion and the key block has substantially the form of a spherical segment.

In this way, the key block has no longer a plane cover surface, but the single dial keys substantially are the sections of a spherical segment which are flush with the cover surface of the housing. As the key block is arranged in a panel portion which is pivoted in the housing, the key block may easily and conveniently be turned in a way such that it approximately faces the operating person, so that it is no longer necessary to the displace or turn the whole telephone. Such a design considerably simplifies the handling of the telephone according to the invention, and another advantage lies in that owing to its particular design this telephone meets highest aesthetical requirements.

Preferably the pivoted panel portion is arranged concentrically to the panel itself. Such a design has the advantage that the pivoted key block is equally well visible from all sides. The viewing angle is particularly advantageous when according to another proposal of the invention the key block is excentrically disposed in the pivoted panel portion such that its middle axis, which corresponds to the alignment of the designations of the respective dial keys, extends in radial direction of the pivoted panel portion. Such a design is advantageous also in those cases when the pivoted panel portion further comprises a display device which is adjacent to the key block, because for recognizing such display a specific angle of view is required.

The electrical connection between the pivoted members and a printed circuit board arranged in the bottom area of the housing is to be provided by flexible cables, whereby also in the long run an easy rotatability of the panel portion containing the key block can be provided, without any cables getting loosened thereby.

In a preferred embodiment the key block including the display device is inserted in the pivoted panel portion in a way that it may easily be released. Owing to such a design the telephone according to the invention may be used as both table telephone and wall telephone, for which purpose it is required only to insert the key block with the display device, turned by 180°, into the pertinent clearance in the pivoted panel portion. Due to the spherical form of the housing and of the key block the telephone with the panel portion turned by 180° and with the inserted key block accordingly turned by 180°, which is fastened at a suitable height on a vertical surface, offers the operating person a favorable angle for looking to and operating the dial keys.

Suitably the range of rotation of the panel portion is limited to prevent the electrical connection between the pivoted operating elements and the printed circuit board from being impaired or damaged. Said range of rotation of the panel portion may be limited to 210°, and the turning safety may be provided by stop members. Further, the pivoted support may be designed such that the panel portion engages in partial pitches of e.g. 5° and is easily releasable.

In order to limit the basal surface of the telephone it is proposed to provide the housing with a rectangular bottom surface and vertically extending lateral walls. Thereby the lateral walls have the form of circular segments and the design of the telephone according to the invention is particularly beautiful.

According to another preferred embodiment of the invention in two neighboring corners of the housing there are provided synclinal depressions for receiving the earpiece and the mouthpiece of the telephone handset. The middle portion connecting the earpiece and the mouthpiece of the telephone handset may be spherically curved, and the inside surface of the middle portion rests against the housing. Thus, the bend radius of the telephone handset is the same as the spherical radius of the housing, whereby the telephone handset and the housing form a harmonious whole.

According to another preferred embodiment it is proposed to dispose in the housing, on the contact surface of the middle portion of the telephone handset, two magnets and to provide the middle portion at appropriate locations with constructional parts, particularly of a ferromagnetic material. This serves to safely hold the resting telephone handset which is thus safely held on the housing also in those cases when the telephone is used as wall telephone.

According to another embodiment of the invention it is proposed to provide the middle portion of the telephone handset with a hinged cover, on the inner side of which there is arranged a phone numbers register. Due to such a particularly advantageous embodiment of the telephone according to the invention the most important phone numbers are always at hand and readily available.

The hinged cover may be released from the locked condition by a press button mechanism, and the press button and the microphone cutout key which is also disposed on the handset will form the constructional parts relating to the magnets, both of which hold the resting handset on the housing in cooperation with the magnets. A loudhearing device may be arranged on the pivoted housing portion.

Alternatively, the hinged cover may be pivotally attached at a distance from the narrow-sided lateral edge and released from the locked condition by light pressure upon the marginal section projecting beyond the bearing axis. The opening of the hinged cover is a particularly simple step, which is further simplified when the hinged cover is acted upon in the opening direction by a spring. The hinged cover will thus spring into the opened position by itself when it is released from the locked condition by light pressure.

Suitably on the underside of the bottom wall of the housing there are provided grooves for receiving the handset cable and the telephone subscriber's cable, said grooves leading from the lateral edges to the middle portion, and said cables extending across through-holes provided in the middle portion of the bottom wall into the interior of the housing, so that the cables running in the grooves may be exchanged for left-handed and right-handed operation.

According to another proposal of the invention the keys of the key block may contain grip depressions, the designations of the keys being located outside the depressions so that these designations remain visible when the keys are being operated, and further are protected against too early abrasion of the digits printed thereon. Besides that, from the technical point of view the printing may be more easily applied on a plane surface than on a concave surface.

Further features, advantages and details of the invention will become more apparent from the following specification of a preferred embodiment as well as from the drawings.

LIST OF DIFFERENT VIEWS OF THE DRAWINGS FIG. 1 is a plan view to the telephone according to the invention;

FIG. 2, FIG. 3, FIG. 4. and FIG. 5 are a rear view, a side view, a front view and a view from below respectively of the telephone according to FIG. 1;

Figure 1:
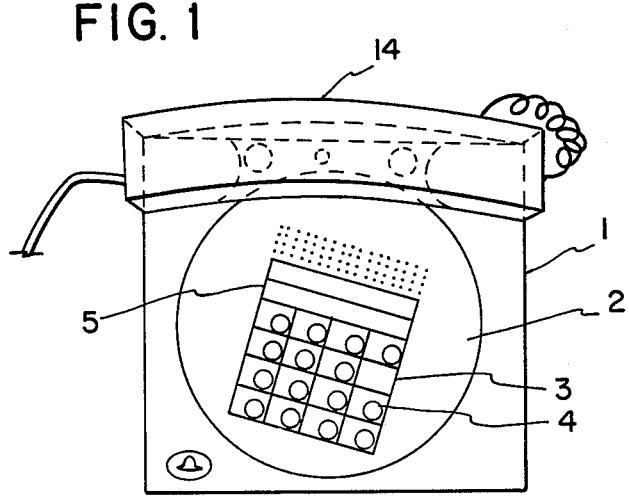
Figure 2:
Figure 3:
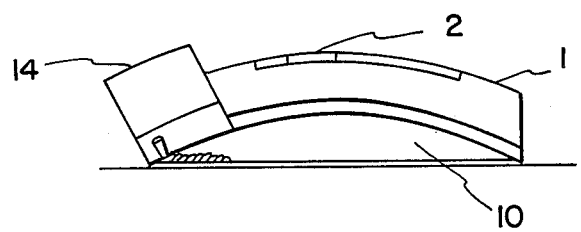
Figure 4:
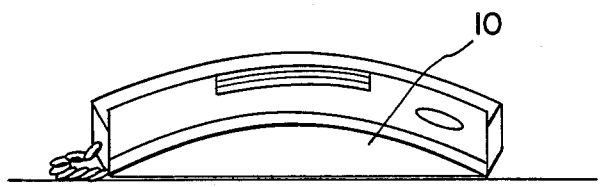

DESCRIPTION OF A PREFERRED EMBODIMENT The telephone shown in the Figures has a housing 1 with a concentrically disposed and pivoted panel portion 2, which is circular in the horizontal projection and forms a spherical section of the panel. In the housing portion 2 there is inserted a key block 3 comprising dial keys 4, and a display device 5 which, together with the key block 3, may be turned by 180° and then inserted into the panel portion 2 when the telephone is used as wall telephone.

Figure 7:
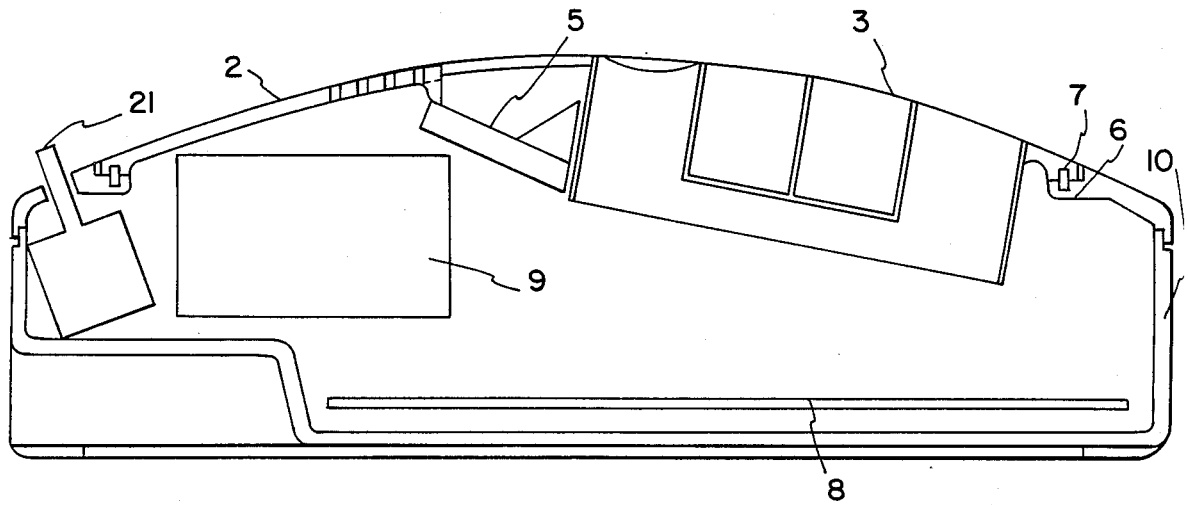
FIG. 7 is a cross-sectional view through the telephone along the line VII—VII in FIG. 6.

FIG. 7 shows that the pivoted panel portion 2 rests upon projections 6 of the housing 1, and a circumferentially sliding packing ring 7 prevents foreign particles from entering into the interior of the housing 1. In the bottom region of the housing 1 there is arranged a printed circuit board 8 which by means of flexible cables (not shown) is connected with the pivoted elements such as the dial keys 4.

The loud-speaker 9 is also arranged on the pivoted housing portion 2.

The housing 1 has a quadrangular bottom surface and vertically extending lateral walls 10 which have the form of circular segments. In two neighboring corners of the housing 1 there are provided synclinal depressions 11 for receiving the earpiece 12 and the mouthpiece 13 of the telephone handset 14. The middle portion 15 of the telephone handset 14 is spherically curved in a way such that it may rest against the corresponding portion of the housing 1.

Figure 6:
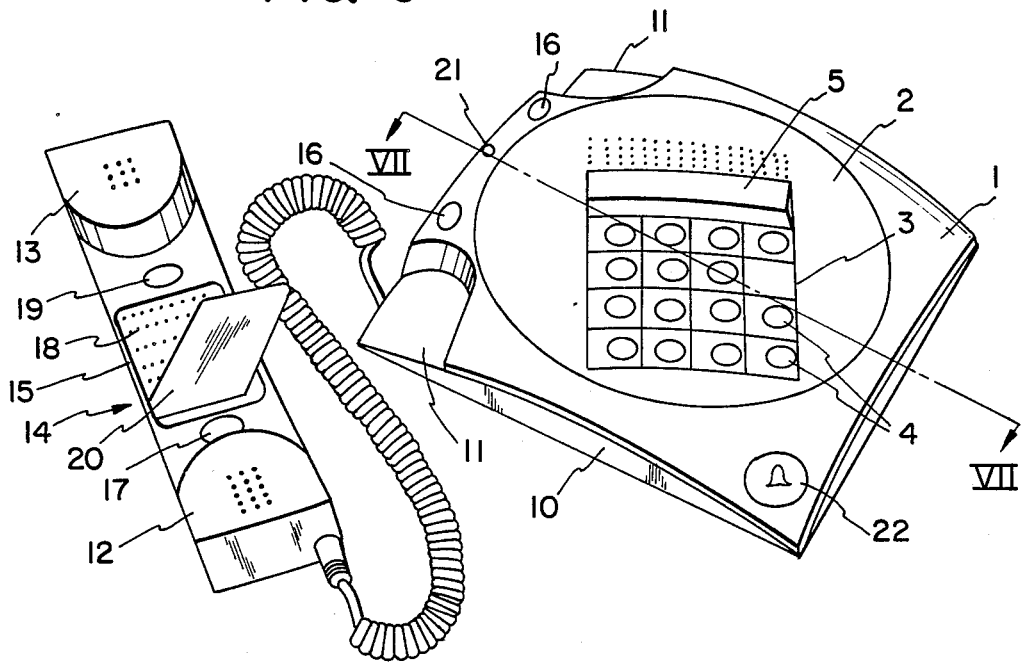
FIG. 6 is a perspective view of the telephone.

For safely securing the telephone handset 14 on the housing 1, two magnets 16 are embedded in the housing 1, said magnets co-acting with ferromagnetic constructional parts, namely a press button 17 for a phone numbers register 18 and a microphone cutout key 19, which are provided at appropriate locations of the middle portion 15 of the telephone handset 14 (see FIG. 6).

The phone numbers register 18 is arranged on the inner side of a pivotally attached hinged cover 20 which may be released from the locked condition by operating the press button 17. The hinged cover 20 is acted upon in the opening direction by a spring (not shown).

On the contact surface for the middle portion of the telephone handset 14 there is further a cradle switch 21 located in the housing 1. In a corner of the housing 1, opposing the telephone handset 14, there is provided a button 22 for adjusting the signal loudness ranging from loud to inaudible so that in the latter case the subscriber is not disturbed.

Figure 5:
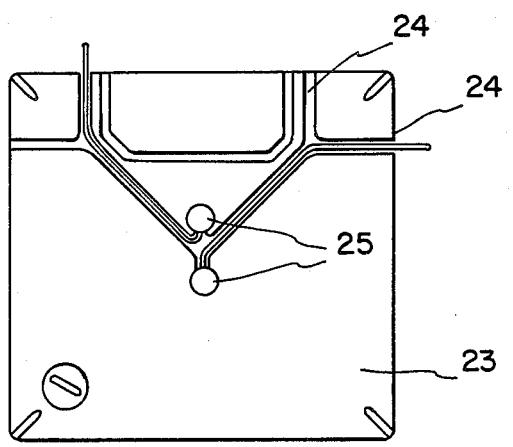

FIG. 5 shows that on the underside of the bottom wall 23 of the housing 1 there are arranged grooves 24 for providing a connection between through-holes 25 made in the middle portion of the bottom wall 23 and the lateral edges of said bottom wall. Such grooves offer various possibilities of leading the handset cable and the telephone subscriber's cable from lateral edges of the housing 1 to the centrally disposed through-holes 25 and from there into the interior of the housing.

Owing to the fact that the cover surface of the housing 1 comprising the pivoted panel portion 2 which contains the key block 3 has substantially the form of a spherical segment, the telephone may safely and conveniently be operated also from a lateral or rearward position, in that the pivoted panel portion 2 with the key block 3 is turned into a position where it approximately faces the operating person.

I claim:

1. A telephone comprising a housing having a rectangular bottom surface, vertically extending lateral walls, and a cover surface, a circular panel portion pivotally mounted on said cover surface, and a key block mounted on said panel portion, said cover surface of said housing, said panel portion, and said key block being contoured to substantially form a segment of a sphere; a telephone handset having an earpiece and a mouthpiece and a middle portion connecting said earpiece and said mouthpiece, said middle portion of said handset having an inner surface and including a hinged cover provided with a phone number register on the inner side thereof, said cover surface having synclinal depressions in two neighboring corners thereof for respectively receiving said earpiece and said mouthpiece of said handset on resting of said handset on said housing; said middle portion of said handset being spherically curved so that the inside surface thereof rests against said cover surface of said housing when said handset is disposed therein with said earpiece and said mouthpiece thereof respectively received in said synclinal depressions.

2. A telephone as specified in claim 1 wherein said hinged cover is pivotally attached to said middle portion of said handset so that the bearing axis of pivotal attachment is spaced from one marginal edge of said hinged cover in juxtaposition to provide a marginal section of said hinged cover whereby said hinged cover may be opened 3. A telephone as specified in claim 1 wherein said middle portion of said handset includes a microphone cut-out key and a press button for releasing said hinged cover form the locked condition, said microphone cut-out key and said press button being spaced apart and comprised of ferromagnetic material, and wherein said housing includes two magnets in juxtaposed position to interact with said microphone cut-out key and said press button whereby to hold said handset safely at rest on said housing.

* * * * *